(12) United States Patent
Nagaraja et al.

(10) Patent No.: US 11,720,742 B2
(45) Date of Patent: *Aug. 8, 2023

(54) DETECTING WEBPAGES THAT SHARE MALICIOUS CONTENT

(71) Applicant: PayPal, Inc., San Jose, CA (US)

(72) Inventors: Vinjith Nagaraja, Scottsdale, AZ (US); Meethil Vijay Yadav, Scottsdale, AZ (US); Bradley Wardman, Phoenix, AZ (US)

(73) Assignee: PayPal, Inc., San Jose, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 17/020,232

(22) Filed: Sep. 14, 2020

(65) Prior Publication Data

US 2021/0105298 A1   Apr. 8, 2021

Related U.S. Application Data

(63) Continuation of application No. 15/849,395, filed on Dec. 20, 2017, now Pat. No. 10,778,716.

(51) Int. Cl.
*G06F 40/143* (2020.01)
*H04L 9/40* (2022.01)
*H04L 67/02* (2022.01)
*G06N 20/00* (2019.01)
*G06F 16/9535* (2019.01)
*H04L 67/04* (2022.01)
*G06F 40/242* (2020.01)
*G06F 40/14* (2020.01)
*H04L 67/01* (2022.01)

(52) U.S. Cl.
CPC ........ *G06F 40/143* (2020.01); *G06F 16/9535* (2019.01); *G06F 40/14* (2020.01); *G06F 40/242* (2020.01); *G06N 20/00* (2019.01); *H04L 63/1441* (2013.01); *H04L 67/01* (2022.05); *H04L 67/02* (2013.01); *H04L 67/04* (2013.01); *G06F 2221/2119* (2013.01)

(58) Field of Classification Search
CPC .................................................. G06F 40/143
See application file for complete search history.

(56) References Cited

U.S. PATENT DOCUMENTS

2010/0095375 A1\* 4/2010 Krishnamurthy ..... G06F 16/951
707/E17.108
2017/0126723 A1\* 5/2017 Wang ..................... G06F 40/226
2019/0190946 A1\* 6/2019 Nagaraja ................. G06F 40/14

\* cited by examiner

*Primary Examiner* — Simon P Kanaan
(74) *Attorney, Agent, or Firm* — Haynes and Boone, LLP (57) ABSTRACT

Methods and systems for detecting webpages that share malicious content are presented. A first set of webpages that hosts a web account checker is identified. A baseline page structure score and a baseline language score are calculated based on the identified first set of webpages. Content from a second set of webpages is collected and analyzed based on the calculated baseline page structure and the calculated baseline language scores. One or more of the second set of webpages is flagged as malicious based on the analyzing of the content collected from the second set of webpages.

20 Claims, 4 Drawing Sheets

DETECTING WEBPAGES THAT SHARE MALICIOUS CONTENT

CROSS REFERENCED TO RELATED APPLICATIONS

This application claims priority to and is a continuation of U.S. patent application Ser. No. 15/849,395, filed on Dec. 20, 2017, the contents of which are incorporated herein by reference in its entirety.

TECHNICAL FIELD

The subject technology generally relates to the prevention of cyberattacks, and more particularly to prevent the theft of account credentials used to access user accounts through large-scale automated login requests directed against a web application.

BACKGROUND

Credential stuffing has become an increasingly more popular mechanism of attack against organizations that employ online user authentication. The rise in such activity is the direct result of to the volume of compromised credentials that are being made available to attackers. The tools that may be used for these attacks are being created and modified by developers, and shared on underground forums. Credential stuffing tools can exist as applications or scripts on the attacker's machines. Alternatively, these tools can be hosted on websites, thereby making the tools widely available to additional attackers via simple search queries. The use of these easily accessible tools can produce security compromises that result in monetary loss to consumers and/or merchants.

SUMMARY

According to various aspects of the subject technology, a system for detecting webpages that share malicious content is presented. A first set of webpages that hosts a web account checker is identified. A baseline page structure score and a baseline language score are calculated based on the identified first set of webpages. Content from a second set of webpages is collected and analyzed based on the calculated baseline page structure and the calculated baseline language scores. One or more of the second set of webpages is flagged as malicious based on the analyzing of the content collected from the second set of webpages.

According to various aspects of the subject technology, a method for detecting webpages that share malicious content is provided. A precomputation is performed by calculating a baseline page structure score and a baseline language score based on a first set of webpages identified as webpages that host web account checkers. Content is collected from a second set of webpages for analysis. The content collected from the second set of webpages is analyzed by calculating a page structure score based on the baseline page structure score, and calculating a language score based on the baseline language score. A determination is made whether at least one of the calculated page structure score or the calculated language score exceeds a predetermined threshold. One or more of the second set of webpages is flagged as malicious in response to determining that at least one of the calculated page structure score or the calculated language score exceeds the predetermined threshold.

According to various aspects of the subject technology, a non-transitory machine-readable medium having stored thereon machine-readable instructions executable to detect webpages that share malicious content is presented. A first set of webpages that hosts a web account checker is identified. A baseline page structure score and a baseline language score are calculated based on the identified first set of webpages. Content from a second set of webpages is collected and analyzed based on the calculated baseline page structure and the calculated baseline language scores. One or more of the second set of webpages is flagged as malicious based on the analyzing of the content collected from the second set of webpages.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Data breaches have become a more common trend in recent years. The prevalence of point and click penetration testing tools has facilitated such breaches that can provide attackers with copious amount of data (e.g., credit cards, personally identifiable information, usernames and password combinations, etc.) that can be monetized in criminal forums. For example credit card information can be monetized to purchase goods, or can be sold off to other unscrupulous individuals. Personally identifiable information can be used for committing identify theft or for spear phishing tactics. As for credentials such as usernames and password combinations, criminals can use this information to not only gain access to the accounts of the organization that they breached, but often times, those same credentials can be reused to get into other accounts in other organizations owned by the user of the credentials. This type of attack is referred to as account validation attacks or credential stuffing. Once the account credentials have been confirmed to be valid for other organizations, the information is often used by the attacker to gain access to the accounts for monetization. This information may also be sold off to other cybercriminals. From time to time, this information may be made publically available by being posted on paste sites like pastebin.

Underground communities with forums entirely dedicated to the creation of tools for automatically checking large lists of compromised credentials against various organizations have become more prevalent. One example tool used for account checking is Sentry MBA. Sentry MBA utilizes text-based configuration files to instruct the tool which target sites to attack and how to respond to requests from the target sites. The customization of the configuration files provides Sentry MBA the ability to iterate through user-agents, enable timeouts between requests, as well as respond to various other forms of challenges presented by the targeted site. With the configuration file of a target site, a compromised credential list, and a list of available proxies to send the traffic through, a user may utilize Sentry MBA to infiltrate the target site. While Sentry MBA is a popularly used tool, it is only one of many that are available to cybercriminals for credential stuffing attacks. Programmers continue to develop a number of applications that are custom crafted for targeting specific organizations.

These tools are often distributed through underground forums and marketplaces. The majority of the custom tools target a single organization, though there are tools that can be used to test against numerous different organizations. Developers often update their tools to bypass newer authentication defenses employed by the targeted organizations. While Sentry MBA can be custom configured by the user, most tools are developed as black boxes that are pre-customized by the developer of the tool. Furthermore, some developers create PHP scripts that can be hosted on the Clearnet. These PHP scripts provide users the ability to carry out credential stuffing attacks.

The existence of credential stuffing websites and forums that host tools and instructions for credential stuffing pose serious threats to organizations. Such threats may ultimately result in security compromises and monetary loss to consumers and/or merchants. One way for an organization to combat credential stuffing attacks is to take down websites that disseminate information and tools that promote credential stuffing. In order to take down these websites, organizations must first identify them. This disclosure provides a description of methodologies that may be employed to identify credential stuffing websites. By identifying and then removing the websites, organization may reduce the number of potential bad actors that could otherwise easily obtain information from these websites to carry out a credential stuffing attack.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
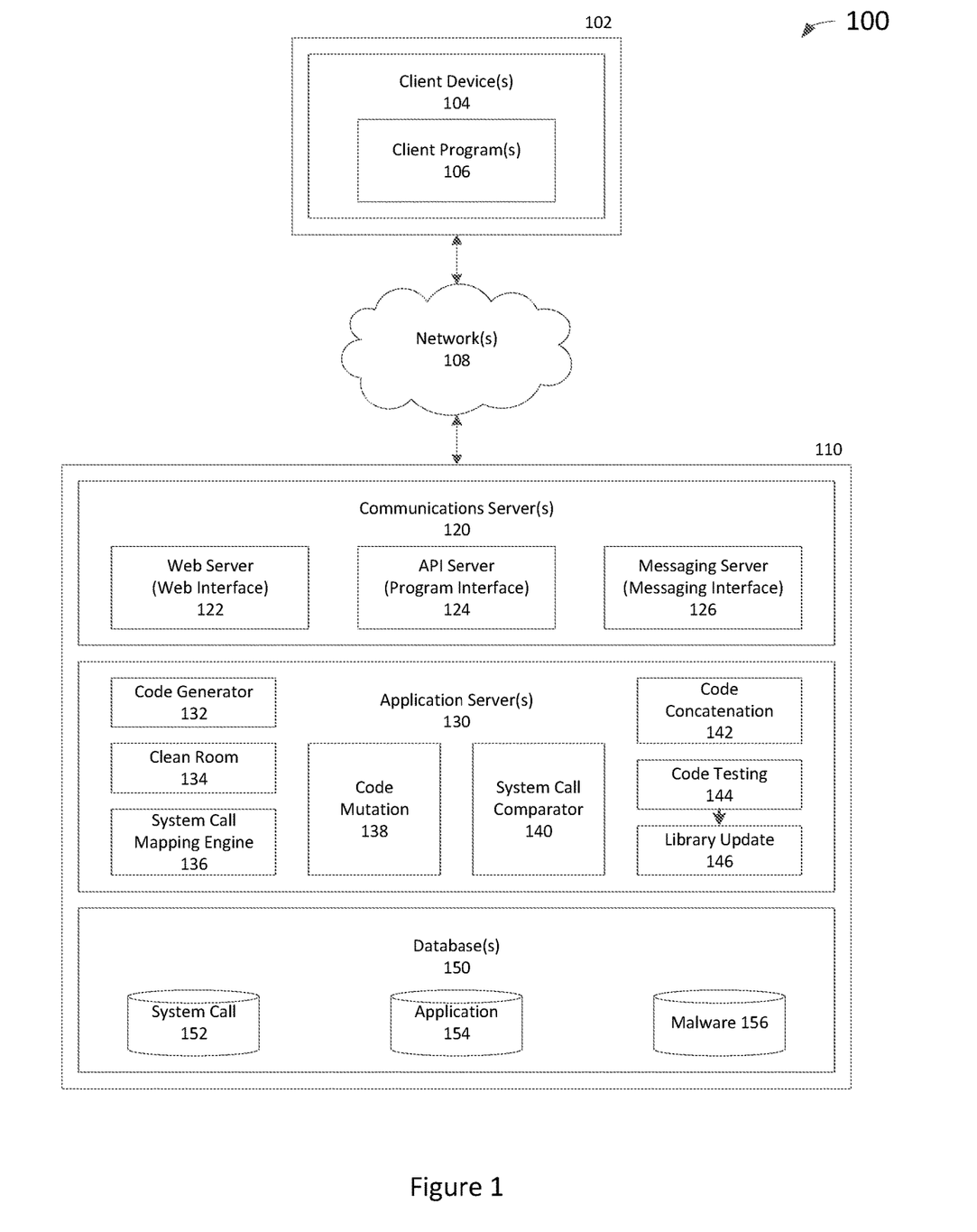
FIG. 1 is a block diagram of an exemplary computing system on which webpages sharing malicious content may be detected.

FIG. 1 illustrates an exemplary embodiment of a computing system adapted for implementing one or more embodiments disclosed herein to detect webpages that share malicious content. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services to client devices, such as tools for detecting webpages that share malicious content and associated libraries. Application servers 130 may include multiple servers and/or components. For example, application servers 130 may include a code generator 132, clean room 134, system call mapping engine 136, code mutation engine 138, system call comparison engine 140, code concatenation engine 142, testing engine 144, and/or library update engine 146. These servers and/or components, which may be in addition to other servers, may be structured and arranged to identify those webpages that malicious content.

Application servers 130, in turn, may be coupled to and capable of accessing one or more databases 150 including system call database 152, application database 154, and/or dictionary database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
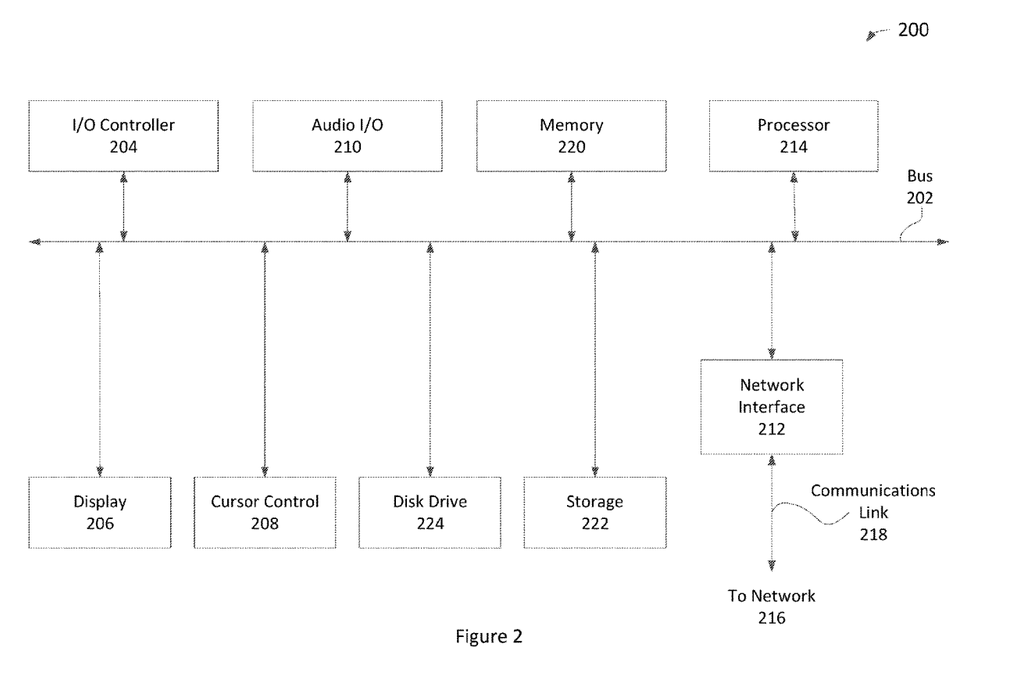
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio input/output component 210 may also be included to allow a user to use voice for inputting information by converting audio signals. Audio I/O component 210 may allow the user to hear audio. A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

There is an assumption that web account checkers typically have a common pattern of Hypertext Markup Language (HTML) form input elements (e.g. text box, check box, etc.) and content (e.g. "account checker", "check mail", etc.) that does not vary much from one web account checker to the next. The absence of variation is due to the fact that threat actors use a common pattern to retain usability, to sell their web account checkers, and to help customers better understand the account checker. Furthermore, since there is little need for descriptive details, web account checkers generally utilize limited English language and HTML syntax having partial structure, thereby lending itself to detection based on certain commonalities (i.e., fingerprinting). For example, the web account checkers requires standard limited input from user like credentials and in some case, proxies. As the input is standard and limited, there is no need for any additional text, information or strings on the page. Similarly, with regards to the structure of the page, as the user input is limited, there are standard text boxes and buttons that are typically used.

Figure 3:
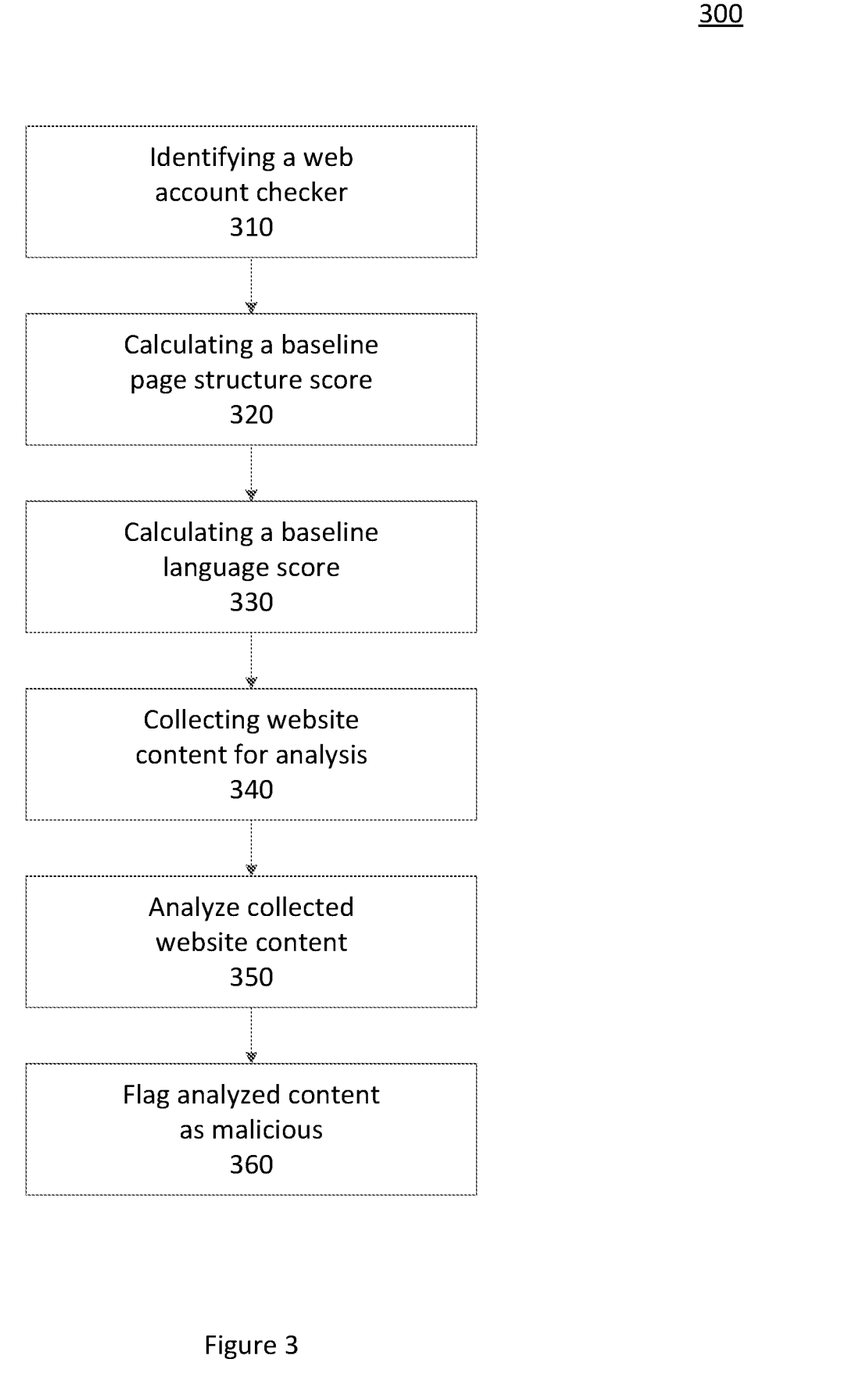
FIG. 3 is a flow diagram illustrating an exemplary process for detecting webpages sharing malicious content.

FIG. 3 illustrates an exemplary process 300 for identifying a web account checkers in order to report it to an administrator. For example, the process detects a web account checker (residing on a host webpage) that poses a threat to an organization. Upon detection of such a web account checker, an alert is generated identifying the potentially malicious webpage so that the organization can work towards getting the webpage and/or the associated content taken down in a proactive manner.

In order to make such a detection, the system must be trained on characteristics of the website on which web account checkers reside. While certain patterns may be found among the web account checkers, slight variations between them may exist. Accordingly, reinforcement learning may be used to account for the variations. In other words, an adaptive fingerprint is continuously computed for all known web account checkers.

A pre-computation is performed in step 310 to define the fingerprint of the initial target malicious tool. The pre-computation step encompasses setting up an initial baseline for identifying a web account checker. The pre-computation process searches specific search terms (e.g., "PayPal account checker") that are found in a dictionary of terms known to be used in web account checker. The search looks for certain terms in order to find security holes in the configuration and computer code that websites use. As a result of the iterating through the search terms within search engine queries, a target webpage (e.g., a webpage on which a web account checker, online phishing instrument, etc., resides) is identified as a webpage that contains one or more known terms that correspond to a web account checker. In other words, a webpage identified as including the specific search terms from the dictionary is determined to be a target webpage related to a web account checker.

In some embodiments, the initial set of terms found in the dictionary are manually input. However, the number of terms included in the dictionary may grow via reinforced learning, as discussed in further detail below.

Once the target webpage is identified, a baseline calculation score for HTML element features is calculated in step 320. The baseline calculation score for HTML element features is determined by identifying initial baseline HTML input element features (both in <form> element and full page), setting the scores based on the order of the elements in <form> tag, and counting the number of HTML input elements per page in the web account checker's sample set. The baseline HTML element features could also include the presence of various HTML tags within the entire body of the page, or within sub-elements such as within the <form> tag. In one example, there may be a specific number of text boxes found within a form that uses a submit button. There are many types of tags that can be considered, such as forms, lists, tables, etc.

As indicated above, the web account checker requires limited input from the user. As a result, the web account checkers will have elements like text boxes and buttons. Since no other info is needed to be displayed or taken from the user, the count of the number of HTML input elements per page plays an important role. The order in which the text boxes having "name" variables appear in the form, however, may be important. For example, input tags may have a type and name:

```
<form action="/example.php" method="get">
Credentials: <input type="text" name="credentials">
Proxies: <input type="text" name="proxies">
<input type="submit" value="Submit">
</form>
```

The order of these types of inputs is an important characteristic of identifying similar forms. This is applicable to the entire page and other sub-elements as well.

The determination of the baseline calculation score for HTML element features further relies on a combination of scores generated from the structure of the HTML elements referred to as Page Structure score (PS-score), and the strings or words used on the page referred to as the Language Score (L-score). In an example embodiment, the PS-score could generate a numerical value based off the presence or absence of HTML entities defined in a dictionary, where the dictionary assigns different weights depending on the element type and the structure in which those entities are organized within the page and within other entities.

Example predefined page structure features may include the following:
1. 7 check boxes followed by a text area followed by submit button in the <form> tag with feature score: 40.
2. Count of 7 check boxes with feature value of 30, with each offset from 7 reducing the feature score by 10.
3. Count of 1 text area with email:password format pre initialed in them feature score: 35.
4. Count of 1 text area with words email or password pre initialed in them feature score: 25.
5. url with word: paypal: score 5
6. url with work checker: score 5

A baseline calculation score for the L-score is then calculated in step 330. The baseline calculation score for language is determined by identifying baseline language keyword features (e.g., terms used in known web account checkers), and by setting baseline scores based the occurrence of words in the sample set of account checkers. An N-gram may be used for setting the scores. For example, L-score could take into account the organization of the words by using models such as N-gram permutation. The L-score may thus be calculated depending on the order in which these terms are used. The L-score can also include translation checks using Google translator because strings can appear in different languages. The translation check ensures that malicious webpages across multiple languages can be identified.

The baseline calculation score is established for the purpose of calculating the language of a webpage, which contributes to the determination of whether a webpage includes a malicious web account checker or not. In an example embodiment, the L-score could generate a numerical value based on the presence of scored words (e.g. "password") or strings of words (e.g. "PayPal checker") found in the dictionary.

Example, L-score may be determined as follows:
1. word: 'account checker': 20
2. word: 'paypal': 10
3. word: 'paypal account checker: 35
4. word: 'check mail': 10
5. word: 'check bank': 10
6. word: 'check card': 10
7. word: 'check': 3
8. word: 'sock5': 4
9. word: 'delim': 4

As shown above, a term such as "delim" may have a score of 4 according to the baseline calculation score, while the term "check" has a score of 3. In some embodiments, both terms showing up in the web account checker will result in a language score that is simply the sum of the two scores, 4 and 3, of the identified terms.

In another embodiment, certain combinations of words may produce a higher score than the sum of the scores corresponding to the terms. For example, "paypal" can have a score of 10, and "account checker" with score of 20. If these words are found at different locations on the page, their score will be 30 (i.e., the sum of 10 and 20). But if they are found next to one another like "paypal account checker," the score may be upwardly adjusted by a multiplier to a score of 35 as shown above because the appearance of both strings provides a stronger indication that a web checker exists on the target webpage. In other words, a multiplier may be used in certain instances to calculate the language score when certain terms are found on the same webpage.

Additionally, the multiplier may be used when the terms are determined to be within a certain number of characters from each other if they're not directly adjacent to each other. While these are two exemplary cases of using the multiplier, one of ordinary skill in the art can appreciate that the use of the multiplier can be derived from other natural language patterns that indicate a relationship between terms found on the webpage.

Once the pre-computation is complete, a web crawler is used to identify website content that may require analysis in step 340. The web crawler systematically browses the internet for the purpose of indexing. A web crawler typically starts with a list of seed URLs to visit. As the crawler visits these URLs, it may identify all the hyperlinks in the page and adds them to the list of URLs to visit. URLs from the list are recursively visited according to a set of policies. Example web crawlers include but are not limited to wget, cURL, urllib, etc. Alternatively, automated browsers driven programs such as Selenium may be used. In some embodiments, a search is performed on the pages that are crawled. The search uses terms found within the dictionary of web account checkers that's pre-computed. In other instances, known good domains can be whitelisted and filtered from the results using the domain name and proper searching (e.g., exclude Wikipedia from Google searches using "NOT SITE:wikipedia.org"). For further efficiency, advertisements that are commonly presented in search results may also be filtered out.

The collected website content is then analyzed in step 350 to determine if the website is a web account checker. Using a classifier trained during the pre-computation, new content may be identified as malicious based on known content types. For example, if the new content fits into a known malicious classification, the new content is flagged as malicious.

For content that does not fit into a known classification, the PS-score is used to analyze the content based on common HTML elements among the web account checkers, such as the form HTML element. Additionally, a manual analysis may be performed on content that does not fit to detect potentially new derivatives of web checkers.

When the page structure score and language score are higher than a threshold, the content is flagged as malicious in step 360. In one embodiment, the threshold may be calculated as threshold=N*PS-score+M*L-score, where M and N are weighting factors. The weights are initialized using the known malicious web account checkers. The weights may be further modified in re-enforcement step when a new web account checker is identified. Webpages are flagged as malicious when a determination is made, based on the scoring, that the webpage is likely to include a web account checker. By flagging the content, an administrator of the organization will be prompted to review the content to further determine whether remedial action needs to be taken.

In some embodiments, the PS-score and L-score may have respective predefined thresholds set for making the decision of whether the webpage is a web checker or not. In other words, webpages with just one of the PS-score or L-score exceeding a threshold may be flagged as malicious. In other instances, both scores may be required to be higher than the threshold in order for the content to be flagged.

In some embodiments, feedback may be provided back to the system, particularly when newly identified web account checker content is discovered. For example, new terms introduced by the newly identified content may be given a value of one. All new terms that have greater than a predetermined value (e.g., a value of five) is then added to the web account checker dictionary that is used to perform future searches. A term with a higher value is considered more important than a term with a lower value. In addition, the value of pre-existing words may be updated in the dictionary if they occur in the new content. More specifically, if a word or term that exists in the dictionary is found in a webpage determined to be a web account checker, a higher confidence that this word or term is associated with a web account checker is indicated by raising the value of the word or term in the dictionary. In some embodiments, a maximum threshold is set (e.g., a value of ten) to avoid over-fitting. The final disposition of whether the content is malicious or not after being reviewed by an administrator may also be an input in the feedback loop.

In some embodiments, the system is trained based on characteristics of the website account checkers to further enhance the ability of the process to detect these websites. Since many of the web account checkers embody design differences, reinforcement learning may be used to compute the average of key features of all known web account checkers and newly found ones. Hence, a new adaptive fingerprint for all known website account checkers is continuously computed. These newly computed features are subsequently used for intelligent reconnaissance to seek out additional website account checkers.

In some embodiments, the scoring structure is updated automatically by increasing or decreasing scores for certain HTML elements. As web account checkers detected by the system is verified to actually be a web account checkers, the system will recalibrate the scoring protocol to reflect the new information that has been obtained. As such, new averages may be calculated for PS-score each time a new web account checker is found, and incorporated for future detection.

In some embodiments, static rules may be set up to classify URL-based URL domains and URL structures (e.g., thread=1, forum=1, github, youtube, etc.). Static classifiers may be set up to classify webpages as social media content, video content, forum, code etc.

In some embodiments, machine learning may be used to further assist in the development of the web account checker library. For example, machine learning algorithms can be used to learn and/or determine which newly detected terms should be added to the dictionary, and how scores for terms that are already in the library should be revised. For example, a term may be newly detected as appearing in a group of webpages that have been confirmed to host web account checkers. The detection of a new term may help train a prediction method for identifying like words or terms via machine learning.

One example machine learning algorithm that suits this application is the Rapid Automatic Keyword Extraction (RAKE) algorithm. RAKE is a keyword extraction algorithm that determines key phrases in a body of text by analyzing the frequency of word appearance and the co-occurrence of the key phrases with other words in the text. By determining the key phrases in a body, the algorithm may provide an indication as to what the text is about. In other words, the key phrases are the critical portions of the entire text, and should be the focal point. Thus, if a text is determined to be associated with a web account checker, then the key phrases from that text should be added to the account checker library.

Machine learning may similarly be used to predict HTML element features that are to be detected by the system. Since there are variations as to how HTML element features associated with web account checkers may be configured, machine learning may be used to determine or predict certain variations that may not have been previously identified.

Figure 4:
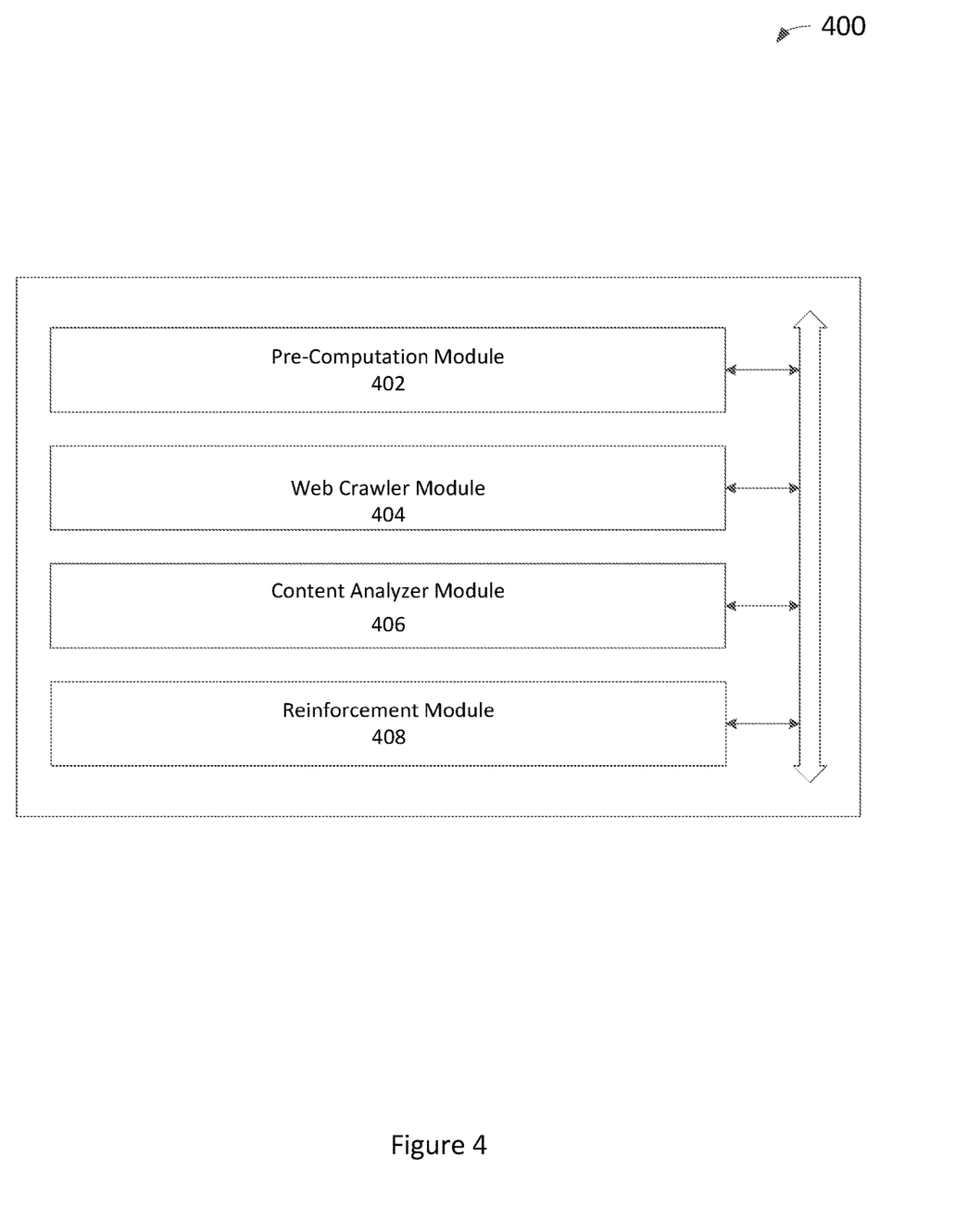
FIG. 4 illustrates an example of components of the system for detecting webpages sharing malicious content.

FIG. 4 illustrates an example of a system utilized to detect webpages sharing malicious content, in accordance with various aspects of the subject technology. System 400 comprises pre-computation module 402, web crawler module 404, content analyzer module 406 and reinforcement module 408. These modules may be in communication with one another. In some aspects, the modules may be implemented in software (e.g., subroutines and code). The software implementation of the modules may operate on a client device 108 application that is running a specific language compatible to the modules. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Pre-computation module 402 provides for determining baseline PS-score and L-score based on which page structure and languages cores are calculated. In other words, the pre-computation module 402 provides a standard from which webpages may be compared to determine if the webpages are hosting malicious content.

System 400 further comprises a web crawler module 404 configured to crawl the internet for webpages that may include malicious content. Web crawler module 404 performs this crawling by searching for specific terms listed in a dictionary of predefined terms associated with web account checkers. Once such a webpage is identified, the webpage is subject to further analysis by content analyzer module 406. Analysis of the webpages by content analyzer module includes but is not limited to determining if content flagged as malicious fits into a known classification by calculating the page structure and language scores to determine if the scores are within predefined threshold. When the page structure score and language scores are higher than the threshold, the content is considered malicious and reported to an administrator for further action.

Lastly, System 400 includes reinforcement module 408. Reinforcement module 408 provides feedback to the system for newly identified web account checker content such as new terms. Reinforcement module 408 also provides rules based on which scores associated with new and old terms can be modified based on the new findings. These new scores are adapted to future detection processes.

For example, if a web page is confirmed to be a web account checker, PS-scores and L-scores are recalculated after adding new features to both as necessary. New features generally start with a base score of 1 and can have a maximum score of 10 and a minimum score of −10. The predefined feature score goes negative incrementally when the feature is found in false positives. The predefined features can go to a maximum feature score of initial base feature score plus 10 and to a minimum of base feature score minus 10. New fingerprints are derived by computing averages of features with the new language and page structure scores. The new language features are used for automated intelligent recon/seeking of web account checkers via reinforcement learning.

The user device described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for detecting malicious activity on webpages comprising:
   a non-transitory memory; and
   one or more hardware processors coupled to the non-transitory memory and configured to read instructions from the non-transitory memory to cause the system to perform operations comprising:

categorizing each of a first set of webpages as a host of a respective online phishing instrument;

defining a baseline page structure metric and a baseline language metric based on the first set of webpages, wherein the baseline page structure metric represents webpage input element features that appear in the first set of webpages, wherein the baseline language metric represents text that appears in the first set of webapges, and wherein the baseline page structure metric and the baseline language metric are usable to provide an indication of whether a webpage hosts one or more of the respective online phishing instruments;

collecting content from a second set of webpages for analysis;

analyzing the content from the second set of webpages using a machine learning classifier trained based on data computed using the baseline page structure metric and the baseline language metric, wherein the analyzing comprises determining, for each webpage in the second set of webpages, a corresponding page structure score using the baseline page structure metric and a corresponding language score based on the baseline language metric; and flagging one or more of the second set of webpages as hosts of the one or more of the respective online phishing instruments based on the analyzing of the content from the second set of webpages.

2. The system of claim 1, wherein the categorizing each of the first set of webpages as the host of the respective online phishing instrument comprises:

searching a plurality of webpages for predefined terms known to be used in association with the respective online phishing instruments, wherein each of the first set of webpages includes at least one of the predefined terms.

3. The system of claim 1, wherein the baseline page structure metric is defined based on Hypertext Markup Language (HTML) feature elements discovered in the first set of webpages.

4. The system of claim 1, wherein the baseline language metric is defined based on terms identified from the first set of webpages.

5. The system of claim 1, wherein the collecting the content from the second set of webpages for analysis comprises identifying, using a web crawler, website content that requires analysis based on a dictionary of pre-computed terms associated with the respective online phishing instruments.

6. The system of claim 5, wherein the collecting the content from the second set of webpages for analysis further comprises filtering out results from an approved list of domains and advertisements.

7. The system of claim 1, wherein the analyzing the content from the second set of webpages using the machine learning classifier comprises:

calculating, for a particular webpage in the second set of webpages, a page structure score using the baseline page structure metric;

calculating, for the particular webpage, a language score using the baseline language metric; and determining whether the particular webpage is a host of the one or more of the respective online phishing instrument based on the page structure score and the language score.

8. A method comprising:

categorizing each of a first set of webpages as a host of a respective online phishing instrument;

determining, by a computer system, a baseline page structure metric and a baseline language metric based on the first set of webpages, wherein the baseline page structure metric and the baseline language metric are usable to provide an indication of whether a webpage hosts one or more of the respective online phishing instruments;

collecting content from a second set of webpages for analysis;

analyzing, by the computer system, the content from the second set of webpages using a machine learning classifier trained based on data computed using the baseline page structure metric and the baseline language metric; and flagging, by the computer system, one or more of the second set of webpages as hosts of one or more of the respective online phishing instruments based on the analyzing of the content from the second set of webpages.

9. The method of claim 8, wherein the categorizing each of the first set of webpages as the host of the respective online phishing instrument comprises:

searching a plurality of webpages for predefined terms known to be used in association with the respective online phishing instruments, wherein each of the first set of webpages includes at least one of the predefined terms.

10. The method of claim 8, wherein the baseline page structure metric is determined based on Hypertext Markup Language (HTML) feature elements discovered in the first set of webpages.

11. The method of claim 8, wherein the baseline language metric is determined based on terms identified from the first set of webpages.

12. The method of claim 8, wherein the collecting the content from the second set of webpages for analysis comprises identifying, using a web crawler, website content that requires analysis based on a dictionary of pre-computed terms associated with the respective online phishing instruments.

13. The method of claim 12, wherein the collecting the content from the second set of webpages for analysis further comprises filtering out results from an approved list of domains and advertisements.

14. The method of claim 8, wherein the analyzing the content from the second set of webpages using the machine learning classifier comprises:

calculating, for a particular webpage in the second set of webapges, a page structure score using the baseline page structure metric;

calculating, for the particular webpage, a language score using the baseline language metric; and determining whether the particular webpage is a host of one or more of the respective online phishing instrument based on the page structure score and the language score.

15. A non-transitory machine-readable medium having stored thereon machine-readable instructions executable to cause performance of operations comprising:

categorizing each of a first set of webpages as a host of a respective online phishing instrument;

determining a baseline page structure metric and a baseline language metric based on the first set of webpages, wherein the baseline page structure metric and the baseline language metric are usable to provide an indication of whether a webpage hosts one or more of the respective online phishing instruments;

collecting content from a second set of webpages for analysis;

analyzing the content from the second set of webpages using a machine learning classifier trained based on the values computed using baseline page structure metric and the baseline language metric; and flagging one or more of the second set of webpages as hosts of one or more of the respective online phishing instruments based on the analyzing of the content from the second set of webpages.

16. The non-transitory machine-readable medium of claim 15, wherein the categorizing each of the first set of webpages as the host of the respective online phishing instrument comprises:

searching a plurality of webpages for predefined terms known to be used in association with the respective online phishing instruments, wherein each of the first set of webpages includes at least one of the predefined terms.

17. The non-transitory machine-readable medium of claim 15, wherein the baseline page structure metric is determined based on Hypertext Markup Language (HTML) feature elements discovered in the first set of webpages.

18. The non-transitory machine-readable medium of claim 15, wherein the baseline language metric is determined based on terms identified from the first set of webpages.

19. The non-transitory machine-readable medium of claim 15, wherein the collecting the content from the second set of webpages for analysis comprises identifying, using a web crawler, website content that requires analysis based on a dictionary of pre-computed terms associated with the respective online phishing instruments.

20. The non-transitory machine-readable medium of claim 19, wherein the collecting the content from the second set of webpages for analysis further comprises filtering out results from an approved list of domains and advertisements.

* * * * *